(12) United States Patent
Spielberg

(10) Patent No.: US 9,158,457 B2
(45) Date of Patent: Oct. 13, 2015

(54) ADJUSTMENT OF MULTIPLE USER INPUT PARAMETERS

(75) Inventor: Anthony C. Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/298,670

(22) Filed: Nov. 17, 2011

(65) Prior Publication Data

US 2013/0127709 A1    May 23, 2013

(51) Int. Cl.
| | |
|---|---|
| G06F 3/033 | (2013.01) |
| G09G 5/08 | (2006.01) |
| G06F 3/041 | (2006.01) |
| G06F 3/045 | (2006.01) |
| G06F 3/0489 | (2013.01) |
| G06F 3/0484 | (2013.01) |

(52) U.S. Cl.
CPC .......... G06F 3/0489 (2013.01); G06F 3/04847 (2013.01)

(58) Field of Classification Search
CPC .............. G06F 3/0482; G06F 3/0481; G06F 17/30277; G06F 17/30864; G06F 3/0488; G06F 3/04883; G06F 3/04842; G06F 3/04886; G06F 3/04817
See application file for complete search history.

(56) References Cited

U.S. PATENT DOCUMENTS

| | | |
|---|---|---|
| 6,191,785 B1 | 2/2001 | Bertram et al. |
| 2003/0135292 A1* | 7/2003 | Husgafvel et al. ............. 700/83 |
| 2007/0005576 A1* | 1/2007 | Cutrell et al. ..................... 707/3 |
| 2008/0144954 A1 | 6/2008 | Chien et al. |
| 2009/0058830 A1* | 3/2009 | Herz et al. ..................... 345/173 |
| 2009/0146961 A1 | 6/2009 | Cheung et al. |
| 2009/0204913 A1* | 8/2009 | Kawano et al. ............... 715/762 |
| 2009/0235193 A1* | 9/2009 | Bhatt et al. ..................... 715/765 |
| 2010/0001961 A1 | 1/2010 | Dieterle et al. |

FOREIGN PATENT DOCUMENTS

| | | |
|---|---|---|
| DE | 100500223 A1 | 4/2002 |
| WO | 9220024 | 11/1992 |
| WO | 2012055613 A1 | 5/2012 |

OTHER PUBLICATIONS

UK search and examination report in counterpart UK patent application GB1219631.7, dated Mar. 26, 2013.
Response to UK search and examination report in counterpart UK patent application GB1219631.7, filed Apr. 10, 2013.

* cited by examiner

*Primary Examiner* — Alexander Eisen
*Assistant Examiner* — Nan-Ying Yang
(74) *Attorney, Agent, or Firm* — Damion Josephs

(57) ABSTRACT

A system includes a display control module, a cursor control device, a graphical user interface comprising a plurality of graphical control elements such as sliders, and a human interface device with keys. A mapping of individual keys or simultaneously selected combinations of keys to sliders is stored by the display control module. A slider is adjustable by the cursor control device while the key mapped to the slider is activated and is disassociated from the cursor control device when the mapped key is deactivated. A computer program product embodiment includes a computer readable medium having computer usable program code for mapping a slider to a corresponding key, activating the slider for adjustment, adjusting the slider with a cursor control device while maintaining a key or combination of keys in the active state, and terminating adjustment of the slider by placing the key in an inactive state.

22 Claims, 10 Drawing Sheets

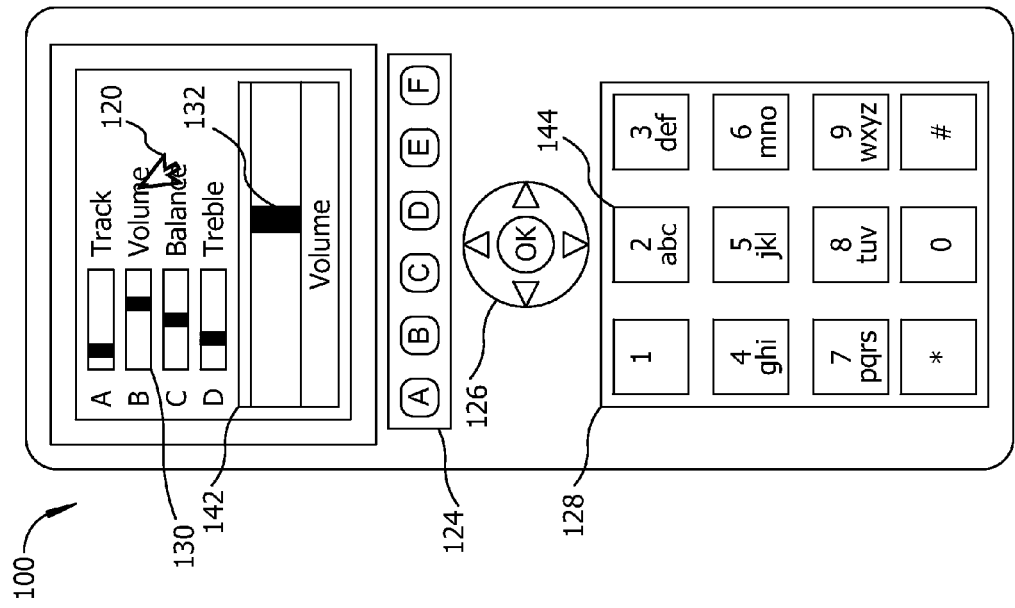
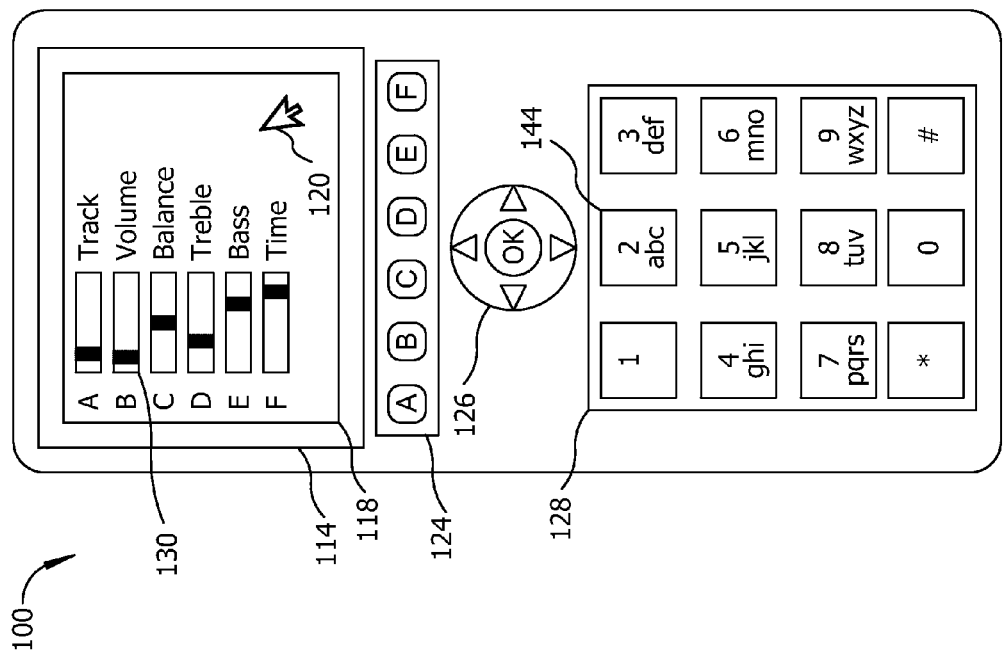

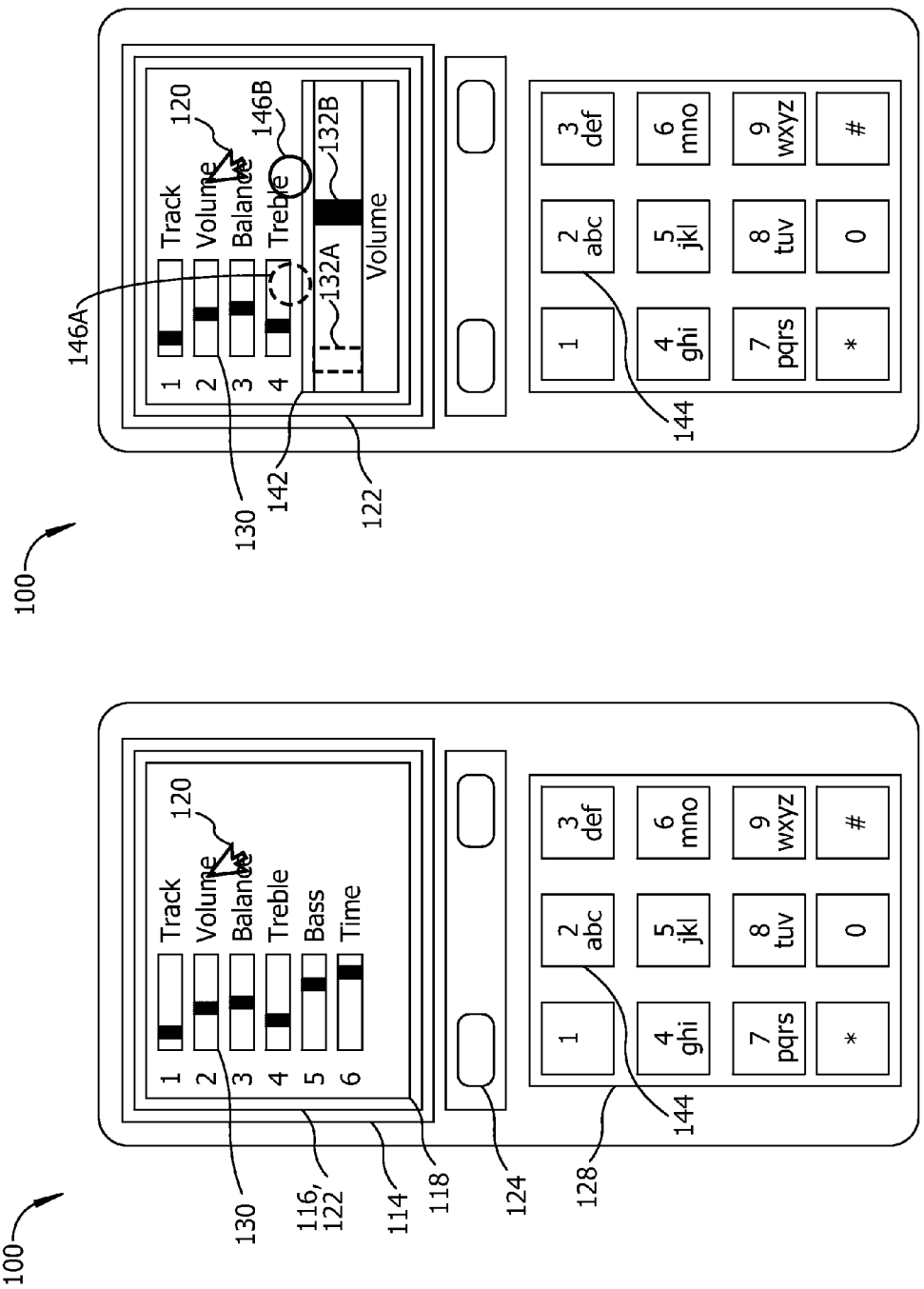

ADJUSTMENT OF MULTIPLE USER INPUT PARAMETERS

BACKGROUND

The present invention relates generally to user adjustment of input parameters for a system having a display and a cursor control device, and more particularly to user adjustment of graphical control elements in a graphical user interface.

Some electronic devices are controlled by entering text commands on a keypad on the device or a keyboard connected to the device. It may be difficult for a user to remember all of the text commands needed to operate an electronic device, the syntax of each command, and the best command to use for a particular operation. Furthermore, typing a string of text characters to enter a command into an electronic device is subject to typing errors and may divert a user's attention from other, more urgent or more important matters. For example, persons who interact with complex process control systems by entering text commands into keyboards may concentrate so intently on entering commands correctly that they fail to notice that the process or system they should be monitoring is not performing optimally.

A user may prefer to interact with an electronic device by adjusting graphical control elements presented on a display rather than by entering text commands into a keyboard or keypad. A user interface which includes graphical control elements on a display is sometimes referred to as a graphical user interface (GUI). Changing a graphical control element in a GUI may cause corresponding changes in a system parameter associated with the graphical control element. A user of an electronic device with a GUI need not remember the underlying system commands the GUI outputs to control the electronic device. A GUI may be arranged so that only those graphical control elements related to a particular operation are visible at one time on a display, making it simpler for a user to learn and remember how to interact with an electronic device.

A cursor control device such as a mouse, touchpad, trackpad, multidirectional cursor key, touch input system on a display, digitizing tablet, or joystick may be used to select and modify a graphical control element in a GUI. To adjust an input parameter associated with a graphical control element, it may be necessary to use the cursor control device to precisely position a cursor over or in close proximity to a selected graphical control element. For example, in some systems, it is necessary for the outer perimeter or outline of the cursor to at least partially overlap the outer perimeter or outline of the selected graphical control element. Then, pressing a button on the cursor control device, often referred to as "clicking", selects the graphical control element for adjustment. Further motion of the cursor control device, sometimes referred to as "dragging", causes a corresponding adjustment of the graphical control element and its corresponding system parameter. Sometimes clicking and dragging are performed simultaneously to adjust a graphical control element. Another "click" may be required to deselect the graphical control element and disassociate further motion of the cursor control device from the graphical control element.

Adjusting a graphical control element by clicking and dragging part of the element is relatively simple when the graphical control elements are large enough and spaced far enough apart to enable a user to quickly and easily select an element with a cursor control device. However, in some systems it may be preferable to view many graphical control elements at the same time so that relationships between individual parameter settings may easily be observed or so that related parameters may be set quickly without paging from one display screen to another. Presenting too many graphical control elements simultaneously on one display may cause the graphical control elements to be so small that it becomes difficult to manipulate a cursor control device precisely enough to select and adjust each graphical control element. Partitioning a related set of graphical control elements onto more than one screen image so that each graphical control element is large enough to view and control easily may require a user to move from one screen image to another by paging or scrolling. Paging or scrolling to view and operate graphical control elements may be inconvenient, slow, cause user confusion, or may have other undesirable effects on user interactions with an electronic device. Locating graphical control elements on pop-ups or pull-downs or resizing graphical control elements with twisties or other resizing controls may also interfere with a user's interactions with a GUI.

BRIEF SUMMARY

In one embodiment, a system includes a display control module, a cursor control device coupled to the display control module, and a graphical user interface displayable by the display control module. The graphical control interface includes a graphical control element. The system further comprises a human interface device in data communication with the display control module. The human interface device includes a key mapped to the graphical control element by the display control module. The graphical control element is adjustable by the cursor control device while the key mapped to the graphical control element is activated. The graphical control element is disassociated from adjustment by the cursor control device when the key mapped to the graphical control element is deactivated.

In another embodiment a system that includes a computing device, a display coupled to the computing device, and a graphical user interface executed by the computing device. An image corresponding to the graphical user interface is presented on the display. The graphical user interface includes a plurality of a graphical control element, and each of the plurality of the graphical control element corresponds to a different controllable parameter. The system further includes a cursor control device coupled to the computing device and a keyboard coupled to the computing device. The keyboard includes a plurality of keys, each of the plurality of keys assigned to a separate one of the plurality of the graphical control element. Activation of a selected one of the plurality of keys activates the one corresponding graphical control element. The cursor control device adjusts the corresponding graphical control element while the selected one of the plurality of keys is activated. Deactivation of the selected one of the plurality of keys ends adjustment of the corresponding graphical control element by the cursor control device.

In another embodiment, a computer program product that includes a computer readable medium having computer usable program code. The computer usable code is configured to apply visual emphasis to a graphical control element, map a graphical control element in a graphical user interface to a corresponding key on a human interface device, activate the graphical control element for adjustment by placing the corresponding key in an active state, adjust the graphical control element with a cursor control device while maintaining the corresponding key in the active state, and terminate adjustment of the graphical control element by placing the key in an inactive state.

In a further embodiment, a method that comprises mapping a graphical control element in a graphical user interface to a corresponding key on a human interface device, activating the graphical control element for adjustment by placing the corresponding key in an active state, and then while maintaining the corresponding key in the active state, adjusting the graphical control element with a cursor control device. The method then continues with ending adjustment of the graphical control element by placing the corresponding key in an inactive state

BRIEF DESCRIPTION OF THE SEVERAL VIEWS OF THE DRAWINGS

FIG. 6 illustrates an exemplary embodiment in which each member of a group of graphical control elements, all viewable at the same time, may be too small for accurate selection with a cursor control device alone;

FIG. 7 continues the example of FIG. 6, showing a cursor automatically attached to a selected slider by activating a key associated with the slider, and further showing an expansion of a slider to facilitate accurate control with the cursor control device;

FIG. 8 illustrates an exemplary embodiment having a touch input system for a cursor control device and a plurality of graphical control elements, each of which are too small for precise selection by a user of the touch input system;

FIG. 9 continues the example of FIG. 8, showing a cursor automatically attached to a selected slider by activating a key associated with the slider, and further showing an example of a touch contact anywhere within the touch active area of the touch input system to adjust a visually emphasized slider;

DETAILED DESCRIPTION

Figure 1:
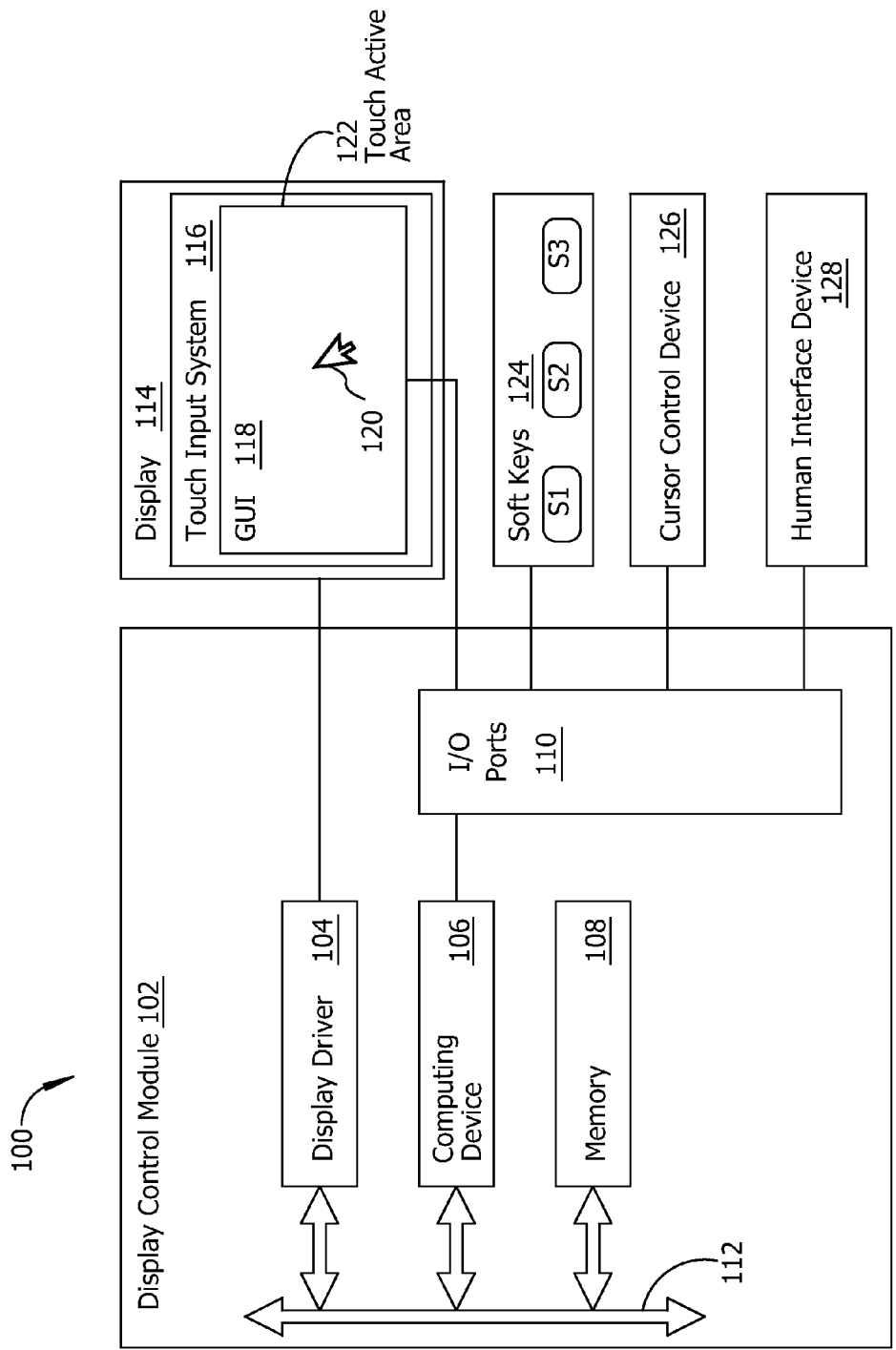
FIG. 1 is a functional block diagram showing an exemplary embodiment of a system having a cursor control device and a human interface device for interacting with a GUI on a display.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

In one embodiment, a system includes a display control module, a cursor control device coupled to the display control module, and a graphical user interface displayable by the display control module. The graphical control interface includes a graphical control element. The system further comprises a human interface device in data communication with the display control module. The human interface device includes a key mapped to the graphical control element by the display control module. The graphical control element is adjustable by the cursor control device while the key mapped to the graphical control element is activated. The graphical control element is disassociated from adjustment by the cursor control device when the key mapped to the graphical control element is deactivated.

In another embodiment a system that includes a computing device, a display coupled to the computing device, and a graphical user interface executed by the computing device. An image corresponding to the graphical user interface is presented on the display. The graphical user interface includes a plurality of a graphical control element, and each of the plurality of the graphical control element corresponds to a different controllable parameter. The system further includes a cursor control device coupled to the computing device and a keyboard coupled to the computing device. The keyboard includes a plurality of keys, each of the plurality of keys assigned to a separate one of the plurality of the graphical control element. Activation of a selected one of the plurality of keys activates the one corresponding graphical control element. The cursor control device adjusts the corresponding graphical control element while the selected one of the plurality of keys is activated. Deactivation of the selected one of the plurality of keys ends adjustment of the corresponding graphical control element by the cursor control device.

In another embodiment, a computer program product that includes a computer readable medium having computer usable program code. The computer usable code is configured to apply visual emphasis to a graphical control element, map a graphical control element in a graphical user interface to a corresponding key on a human interface device, activate the graphical control element for adjustment by placing the corresponding key in an active state, adjust the graphical control element with a cursor control device while maintaining the corresponding key in the active state, and terminate adjustment of the graphical control element by placing the key in an inactive state.

In a further embodiment, a method that comprises mapping a graphical control element in a graphical user interface to a corresponding key on a human interface device, activating the graphical control element for adjustment by placing the corresponding key in an active state, and then while maintaining the corresponding key in the active state, adjusting the graphical control element with a cursor control device. The method then continues with ending adjustment of the graphical control element by placing the corresponding key in an inactive state As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of describing the embodiments disclosed herein, two elements are considered to be coupled when one element is able to send an electrical signal to another element. The electrical signal may represent, for example but not limited to, data, operating commands, status information, or electrical power, or any combination of these electrical signals. A coupling may be implemented by wired or wireless connection means.

Referring now to FIG. 1 there is shown, generally at 100, an exemplary embodiment of a system comprising a display control module 102 coupled to a display 114. The display control module 102 outputs from a display driver 104 video signals representative of a GUI 118 viewable on the display 114. The display control module 102 includes a computing device 106 for executing computer usable program code for displaying and controlling the GUI 118. Examples of a computing device 106 include, but are not limited to, at least one central processing unit in a single user computer system, at least one central processing unit in a multi-user computer system, a microcontroller, a microprocessor, a gate array, an application-specific integrated circuit, a programmable read-only memory comprising any one or more of these computing devices, or a printed wiring assembly comprising one or more of these computing devices. The display control module may optionally be provided as an integral part of the display 114 or may alternately be provided as a separate element coupled to the display 114.

Computer usable program code, data, and other information for operating the display control module 102 and GUI 118 may be stored in a memory 108. The memory 108, computing device 106, and display driver communicate with one another over a data and address bus 112. The memory 108 may be implemented as, for example but not limited to, fixed or removable semiconductor memory, as memory included as part of a microprocessor, microcontroller, application specific integrated circuit, gate array, or programmable read-only memory, as fixed or removable magnetically or optically recordable rotating media, or any combination of these memory examples.

Continuing with FIG. 1, a cursor control device 126 and a human interface device 128 communicate with the computing device 106 through input/output (I/O) ports 110 to control the interactions of a cursor 120 with the GUI 118. Examples of a cursor control device include, but are not limited to, a mouse, a touchpad, a trackpad, a multidirectional cursor key, a touch input system on a display, a digitizing tablet, or a joystick. Examples of a human interface device include, but are not limited to, a keyboard, a keypad, soft keys on the bezel of a display, and soft keys implemented as graphic symbols in a displayed image and operated by detection of a screen contact by a touch input system. In the example of FIG. 1, a touch input system 116 may alternatively be used as a cursor control device 126, as a human interface device 128, or as both a cursor control device and a human interface device. The touch input system 116 reports the positions of detected screen contacts, for example contacts by a user's finger or by a stylus, within a touch active area 122. Data representative of a position of a screen contact is communicated to the computing device 106 through I/O ports 110. FIG. 1 also shows soft keys 124 as an example of a human interface device 128.

A GUI in accord with an embodiment of the invention preferably includes one adjustable graphic control element for each parameter to be controlled. A slider is an example of a graphical control element used to set or adjust values within a range. A slider may be displayed in a GUI as a rectangular bar along which a control setting indicator may be positioned. The length of the bar along its longest axis may be used to represent a range of values for a parameter to be set or adjusted. The position of the control setting indicator relative to an end of the bar may indicate a selected value within the range represented by the length of the bar. Alternatively, a slider may be represented as a rotatable knob with an indictor that may be set within a range of angles of rotation of the knob, the range of angles corresponding to the range of values for the corresponding parameter. Sliders may alternatively have other geometric shapes and use other indicating means for setting a value within a range of values.

A human interface device in accord with an embodiment of the invention preferably includes a separate key, or alternatively a separate combination of simultaneously selected keys, for each graphical control element to be set or adjusted on one screen in a GUI, where one screen refers to all the parts of an image on a display that may be viewed simultaneously without scrolling, paging, or changing a magnification factor. The display control module 102 of FIG. 1 stores in its memory 108 a mapping between each of the graphical control elements in a GUI and a key associated with each graphical control element. In any one screen display comprising more than one graphical control element, each graphical control element has a different key, or alternatively a combination of simultaneously selected keys, associated to it in the mapping. Activating a key or alternatively a combination of simultaneously selected combination of keys causes the cursor in the GUI to become associated with its corresponding graphical control element so that motions of the cursor control device cause corresponding changes in the associated graphical control element, thereby causing a corresponding change in the parameter associated with the graphical control element. Deactivating a key causes the cursor in the GUI to become disassociated from its corresponding graphical control element so that motions of the cursor control device no longer cause corresponding changes in the associated graphical control element.

In some embodiments of the invention, activating a key refers to selecting a key, pressing the key, and holding the key in a depressed position (the "active state" of the key) while moving the cursor control device to adjust the control setting indicator in a graphical control element. Releasing the selected key (i.e., placing the key in a "deactive state") prevents further motions of the cursor control device from adjusting the graphical control element and terminates adjustment of the corresponding parameter. In some embodiments of the invention, activating a key refers to simultaneously depressing a combination of keys. Some examples of activating a key by depressing a combination of simultaneously selected keys include, but are not limited to, <Ctrl><x>, <Shift><Ctrl><x>,<Alt><x>, and so on, where <Ctrl> refers to the "Control" key, <Alt> refers to the "Alt" key, and <x> refers to any other alphanumeric or special function key on a computer keyboard. Correspondingly, releasing a combination of simultaneously selected keys places the combination in a deactive state.

In some applications, it may be inconvenient, difficult, or unsafe to depress a key and manually hold the key in an active state while simultaneously operating a cursor control device to adjust a graphical control element. A process of activating a key may therefore alternatively refer to selecting a key associated with a graphical control element, pressing and releasing the key to put the key in an active state, moving the cursor control device to adjust the control setting indicator in a graphical control element, and pressing and releasing the same key again to place the key in a deactive state so that further motions of the cursor control device cause no further adjustment of the graphical control element.

As explained above, embodiments of the invention operate by relating motions of a cursor control device to corresponding adjustment of a graphical control element in a GUI when a key mapped to the graphical control element is in an active state, and disassociating the cursor control device from further adjustment of the graphical control element after the mapped key is placed in a deactive state. This differs from other systems known in the art in which depressing and releasing a key on a keyboard associates motions of a cursor control device with a predetermined graphical control element, and depressing and releasing the same key again disassociates the motions of the cursor control device from adjustment of the graphical control element and also selects a next graphical control element in a predetermined sequence for adjustment by the cursor control device. In such systems known in the art, it may be difficult for a user to know which, if any, graphical control element will be affected by the cursor control device. Furthermore, because repeatedly pressing the key used for selecting graphical control elements (in some systems, the "tab" key) causes the cursor to step serially from one graphical control element to the next in a predetermined order which may not be alterable by the user, it may take the user a long time to activate a desired graphical control element for adjustment by the cursor control device.

If the user inadvertently causes the cursor to step past the desired graphical control element, he or she may have to step all the way through a predetermined sequence to get back to the desired graphical control element. In contrast to systems known in the art, embodiments of the invention permit a user to immediately associate the cursor control device to any selected graphical control element by activating the key mapped to the graphical control element, without intervening selection of other graphical control elements. Embodiments of the invention may therefore be described as operating with "random access" and systems known in the art as operating with "serial access". Random access is preferable in systems in which a user desires rapid access to and adjustment of a particular graphical control element.

Figure 2:
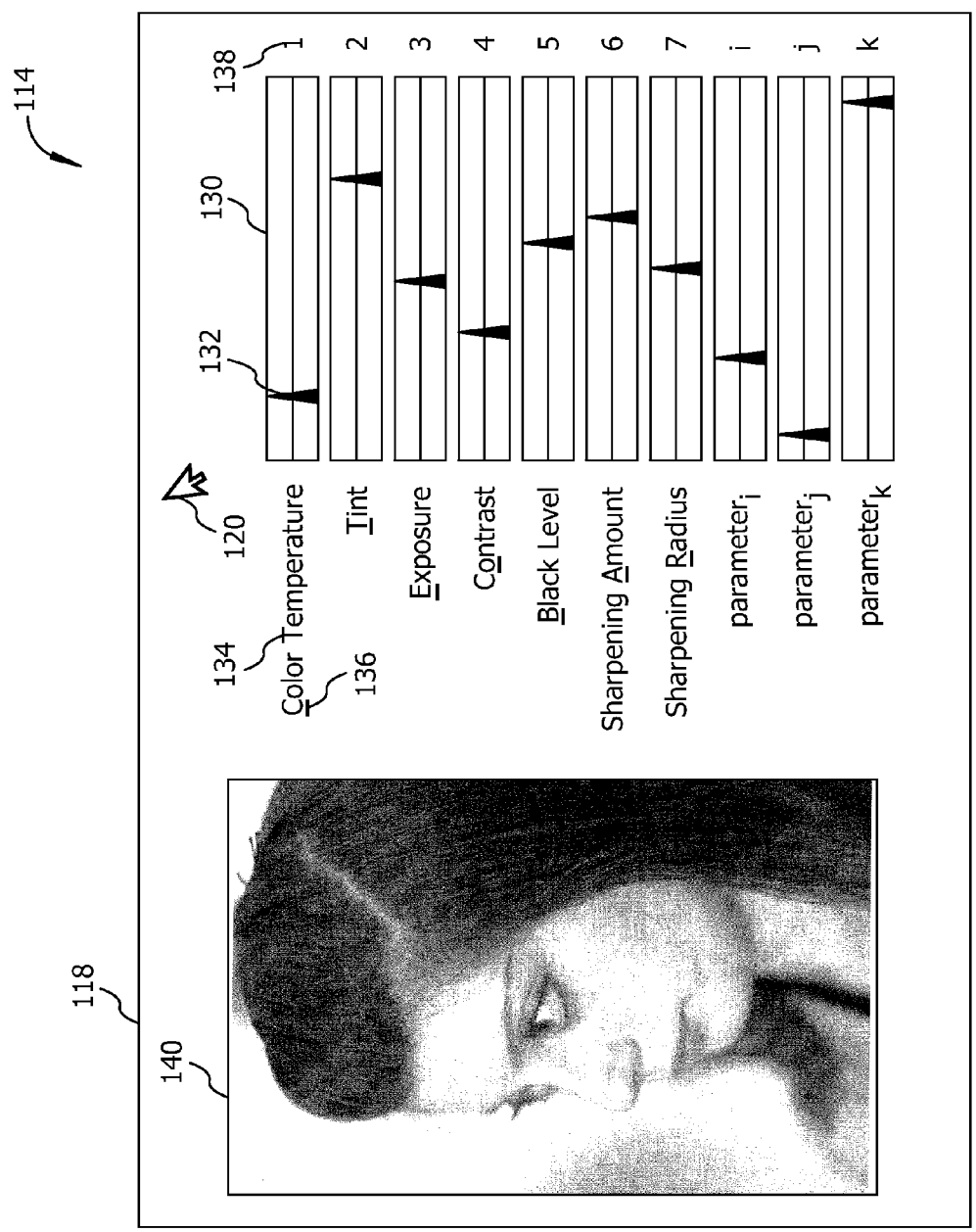
FIG. 2 illustrates an example a display image of a GUI having a plurality of sliders controlled.

FIGS. 2-5 illustrate an example of a GUI operable in accord with an embodiment of the invention. With reference to FIG. 2, there is shown generally at 114 a display with an image representing an example of a GUI 118 on a single screen. The GUI 118 includes a plurality of graphical control element 130 representative of a slider. Each graphical control element 130 includes a control setting indicator 132 for setting a parameter value within a range of parameter values. Each graphical control element may optionally be labeled with a parameter label 134 and may further be labeled with a key label 138. The key label 138 may optionally represent a character, number, or symbol marked on the key mapped to the graphical control element 130. An emphasis mark 136 associated with the parameter label 134 may be used in addition to, or alternately instead of, the key label 138 to identify the key mapped to the graphical control element 130.

The exemplary GUI 118 in FIG. 2 includes a cursor 120. In FIG. 2, the cursor 120 is shown in a neutral location, that is, not associated with any graphical control element 130. In the example of FIG. 2, any manipulations of a cursor control device that cause the cursor 120 to move do not result in adjustment of any of the graphical control elements 130. FIG. 2 also illustrates an example of a data object 140 which may optionally be altered by changing selected graphical control elements 130. FIG. 2 further represents a GUI 118 in which all "k" number of parameters associated with a related group of image editing operations are visible simultaneously on a single screen.

Figure 3:
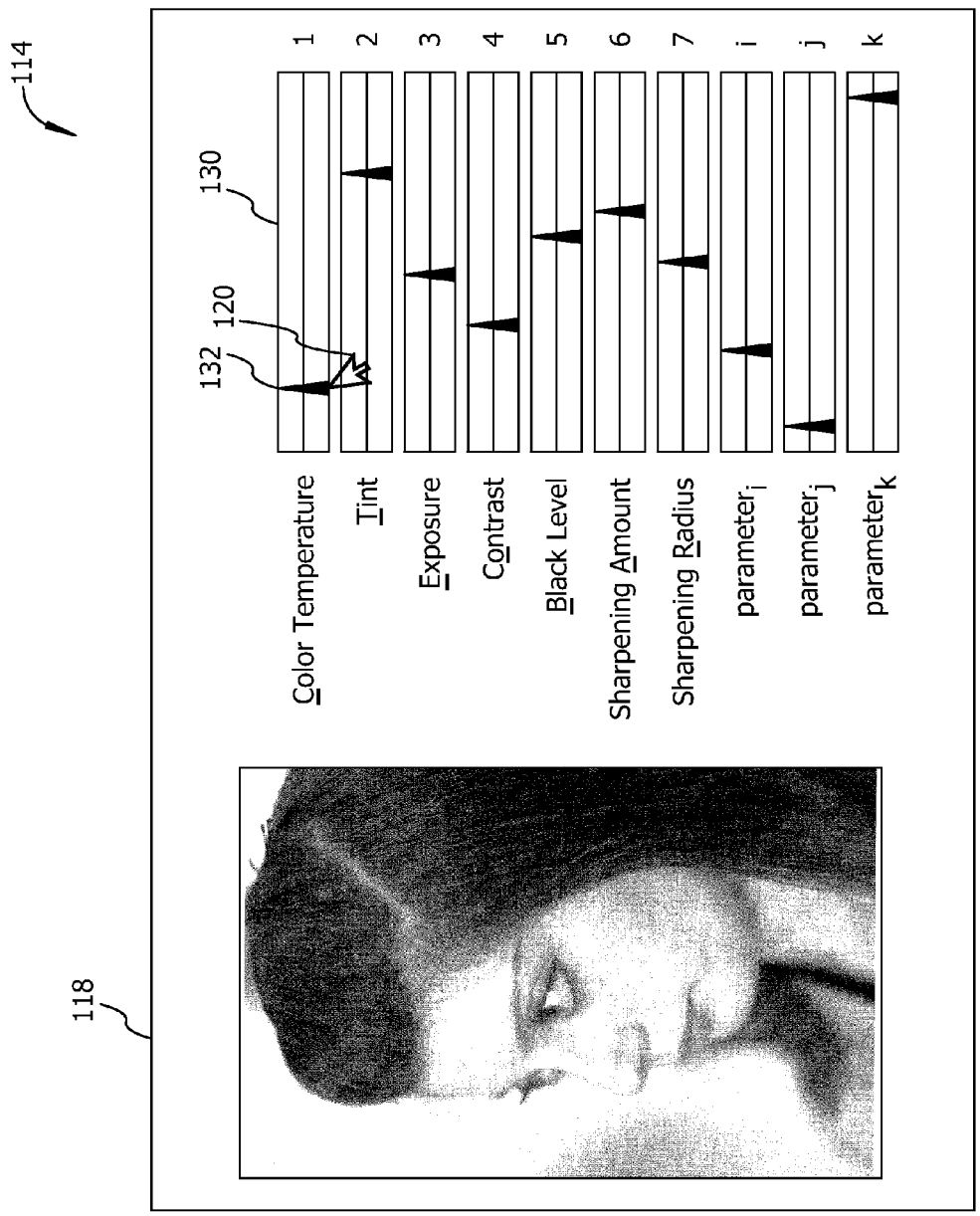
FIG. 3 continues the example of FIG. 2, showing a cursor automatically associated to a selected slider by activating a key associated with the slider.
Figure 4:
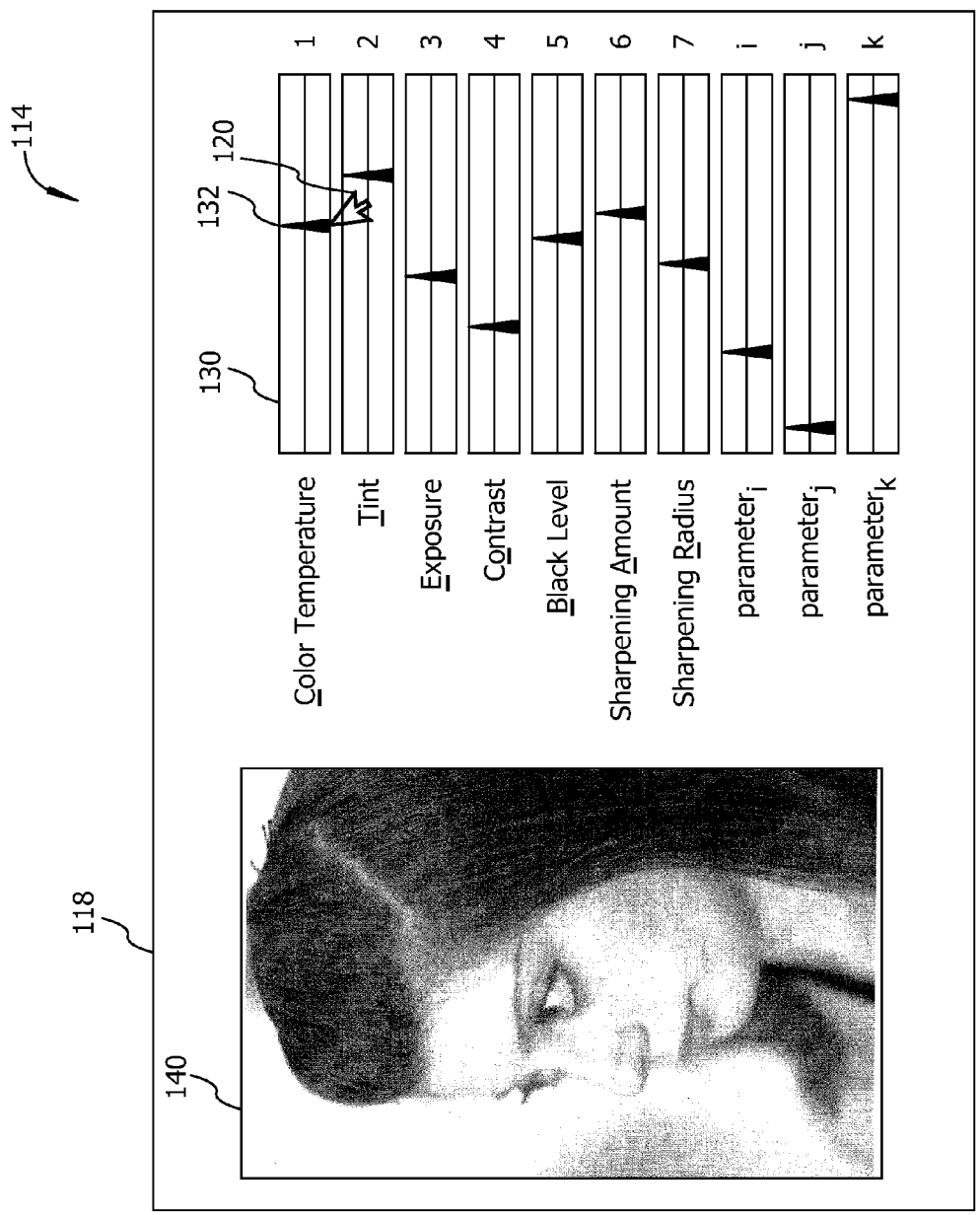
FIG. 4 continues the example of FIGS. 2-3, showing an adjustment of the selected slider.

Referring now to FIG. 3, it may be seen that the cursor 120 has been associated with a selected graphical control element 130. In the example of FIG. 3, the cursor 120 is shown associated to the control setting indicator 132 to show that the parameter "Color Temperature" was selected for adjustment by activating the "C" key, or alternately by activating the "1" key. Continuing with FIG. 4, it may be seen that the control setting indicator 132 for the Color Temperature slider 130 has been moved to the right compared to its position in FIG. 3, thereby adjusting a value for the parameter Color Temperature. Note that the user was not required to accurately position the cursor 120 near the control setting indicator 132 with a cursor control device (cursor control device not illustrated in FIGS. 2-5) in order to rapidly and accurately associate the cursor 120 to the desired graphical control element. Instead, the cursor was associated to the desired graphical control element by activating the indicated key and the cursor control device was moved to change the parameter value. After the cursor is associated with a graphical control element, any further cursor motion causes a corresponding proportional adjustment of the graphical control element. Embodiments of the invention therefore eliminate the need for precise manipulation of a cursor control device in order to select a desired graphical control element.

Figure 5:
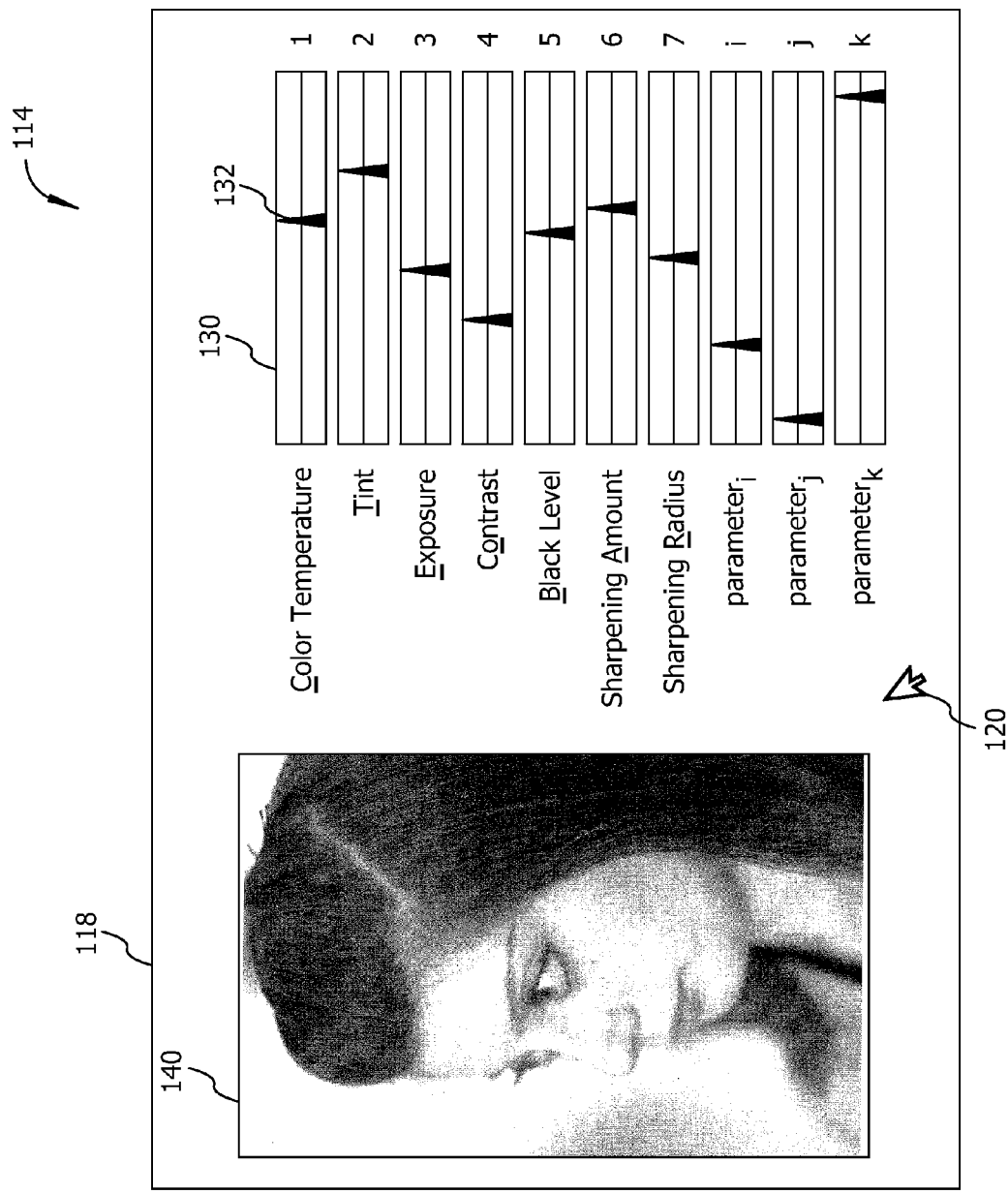
FIG. 5 continues the example of FIGS. 2-4; showing the cursor disassociated from further adjustment of the selected slider.

Continuing with the example of FIGS. 2-5, it may be seen in FIG. 5 that the cursor 120 has been disassociated from the Color Temperature slider 132. The cursor 120 was disassociated from the graphical control element by deactivating the key mapped to the graphical control element, in the example of FIGS. 2-5 the "C" key or the "1" key. Further manipulation of the cursor control device, represented by a position of the cursor 120 near the bottom of the display 114, has no effect on the position of the control setting indicator 132 or on the related Color Temperature parameter value.

Some systems known in the art map a plurality of hardware controls, for example analog or digital versions of potentiometers, rheostats, slide switches, multipole switches, and so on, to a corresponding plurality of sliders or other graphical control elements. Such systems known in the art are not practical for small displays, devices used in mobile applications, or displays where the number of displayed sliders is greater than the number of hardware controls. In contrast to systems known in the art, embodiments of the invention are well suited for applications where many graphical control elements are preferably shown on a same small display screen and each graphical control element may be too small for accurate selection by a cursor control device alone.

FIGS. 6-9 illustrate generally at 100 an example of an electronic device in accord with an embodiment of the invention in which graphical control elements on a display are large enough to read but too small for rapid and accurate selection with a cursor control device. With reference to FIG. 6, there is shown an electronic device with a display 114 and a human interface device 128. The display 114 shows an image representative of a GUI 118 comprising a plurality of graphical control elements 130 and a cursor 120 positionable within the GUI 118 by a cursor control device 126. In the example of FIG. 6, the exemplary embodiment of the invention further includes a plurality of soft keys 124. There are a sufficient number of soft keys 124 in the illustrated example to permit a different soft key to be mapped to each of the graphical control elements 130 visible at the same time in the GUI 118. A mapping between each graphical control element 130 and its corresponding soft key 124 may be indicated by a key label or an emphasis mark as previously explained, or by displaying each slider in close proximity to its corresponding soft key. The cursor 120 may be associated with a selected graphical control element by activating the corresponding soft key 124 or by activating a corresponding key 144 in the human interface device 128. For example, in FIG. 6, the "2" key or soft key "B" may be activated to adjust the slider 130 for the parameter "Volume" with the multidirectional cursor key 126.

Referring now to FIG. 7, the cursor 120 is shown associated with the graphical control element 130 for the parameter Volume. The graphical control element may be adjusted by the cursor control device 126 while the key mapped to the graphical control element is active. Adjustment of the graphical control element is terminated when the key mapped to the graphical control element is deactivated. Activating the key mapped to the graphical control element associates the cursor to the graphical control element more easily and more accurately than a user may be able to achieve with a cursor control device alone, particularly if the user's attention is directed at other more urgent or more important activities.

FIG. 7 further illustrates a graphical control element 142 that has been given visual emphasis to clearly indicate which control is being adjusted and to make the adjustments easier to see. In the example of FIG. 7, the graphical control element 130 for the parameter Volume has been visually enhanced by enlarging the graphical control element as shown by the emphasized control 142. The emphasized control 142 may optionally be permitted to obscure other controls which have not been selected for adjustment. Changes in the position of the control setting indicator 132 are more easily seen in the control with visual emphasis 142 of FIG. 7 than in the smaller graphical control elements shown in FIG. 6. As suggested by FIGS. 6-7, visual emphasis of a graphical control element may be accomplished by changing a shape of the control, changing a position of the control, by replicating the control, or by other visual alterations which serve to draw attention to the control.

FIGS. 8-9 expand upon the preceding example by adding a touch input system 116 with a touch active area 122 to the display 114. As in the preceding example, there is shown in FIG. 8 an electronic device with a display 114 and a human interface device 128. The display 114 shows an image representative of a GUI 118 comprising a plurality of graphical control elements 130 and a cursor 120. Unlike FIGS. 6-7, the electronic device of FIGS. 8-9 has fewer soft keys 124 than the number of graphical control elements 130 visible on the screen at one time. The touch input system 116 in FIGS. 8-9 functions as a cursor control device for adjusting sliders visible in the GUI 118. In the example of FIGS. 8-9, keys in a keypad implementation of a human interface device 128 are mapped to graphical control elements so that activating a key, for example key 144, allows adjustment of the graphical control element mapped to the key, for example the graphical control element 130 for the parameter Volume.

A key in an electronic device with a touch input system may be activated by either of the methods earlier described, that is, by pressing and holding a key 144 while operating the cursor control device to adjust a slider and then releasing the key to terminate adjustment, or by pressing a key to activate it, releasing the key during adjustment of the graphical control element, and pressing the same key again to deactivate it and disassociate the cursor control device from the graphical control element. FIG. 9 illustrates how a touch input system may be used in an embodiment of the invention to adjust a parameter value in response to a change in detected screen contact positions. In FIG. 9, the "2" key 144 has been activated to associate the cursor 120 with the graphical control element 130 for the parameter Volume. A replicated graphical control element 142 is displayed to make adjustments to the selected parameter easier to see. The touch input system detects a first screen contact position 146A and a second screen contact position 146B. The two detected screen contact positions may be opposite ends of a continuous stroke contact or may be discrete contacts. The control setting indicator 132 in the emphasized graphical control element 142 is moved by an amount proportional to the separation of the first and second screen contact positions, as indicated by a starting indicator position 132A and a final indicator position 132B. Deactivating the key mapped to the graphical control element prevents further screen contacts from adjusting the graphical control element. In the illustrated example, the user was not required to accurately select either the emphasized graphical control element 142 or the control setting indicator (132A,132B) by touching the screen in order to achieve an accurate adjustment of the Volume parameter. The locations of the first and second screen contacts could occur anywhere within the touch active area 122. The system illustrated in the examples of FIGS. 8-9 is particularly advantageous for users who are unable to accurately position a cursor over a slider to be adjusted, for example because the user or display is being subjected to vibration or other motions, because the sliders are small relative to the screen size, because the user is wearing gloves or has large fingers, or because the user does not wish to divert his or her attention from other activities long enough to accurately control cursor position.

Figure 10:
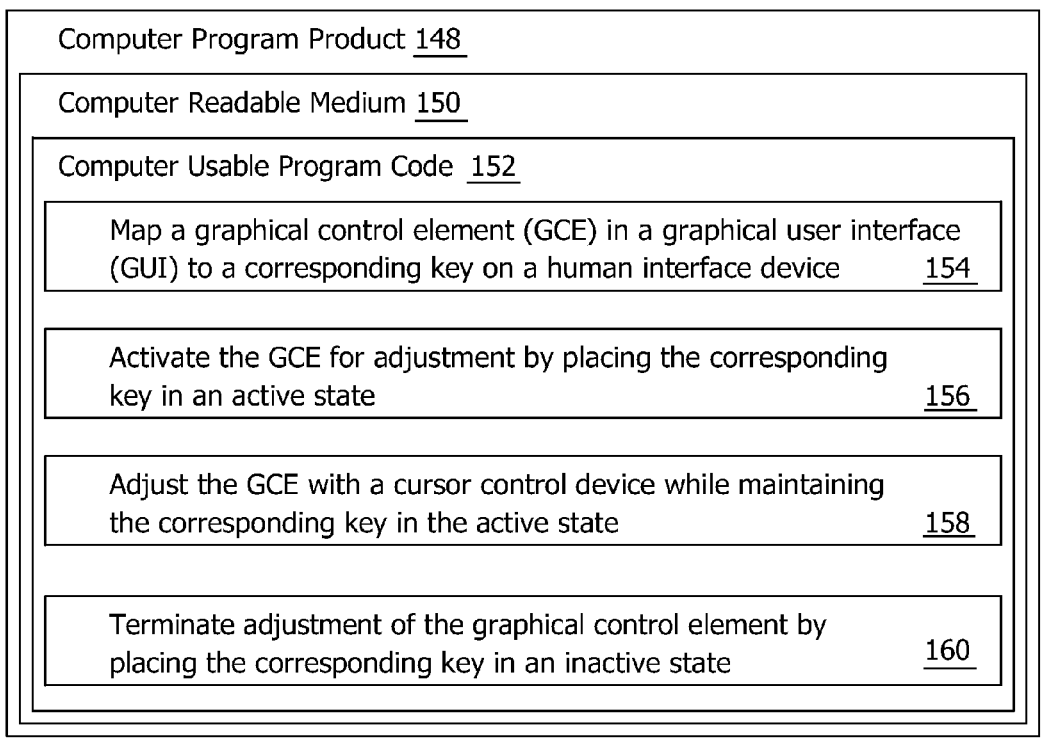
FIG. 10 illustrates an embodiment of a computer program product.

An exemplary computer program product embodiment of the invention is shown generally at 100 in FIGS. 10-15. Referring to FIG. 10, a computer program product 148 optionally comprises a computer readable medium 150 which optionally includes computer usable program code 152 adapted to perform an operation 154 of mapping a graphical control element (GCE) in a GUI to a corresponding key on a human interface device. The computer program product 148 is further adapted to perform the operations of activating the GCE for adjustment by placing the corresponding key in an active state 156, adjusting the GCE with a cursor control device while maintaining the corresponding key in an active state 158, and terminating adjustment of the GCE by placing the corresponding key in an inactive state 160. In alternative embodiments of a computer program product 148, the operations described may be performed in a different order than the order illustrated in FIG. 10.

Figure 11:
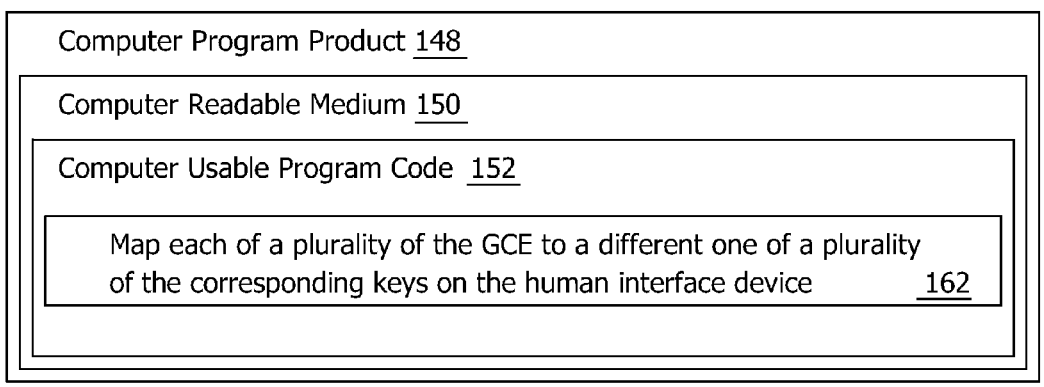
FIG. 11 continues the example of FIG. 10, showing an optional aspect of the computer program product.

The computer program product 148 of FIG. 10 may optionally include an operation of mapping each of a plurality of the GCE to a different one of a plurality of the corresponding keys on the human interface device 162 as shown in FIG. 11.

Figure 12:
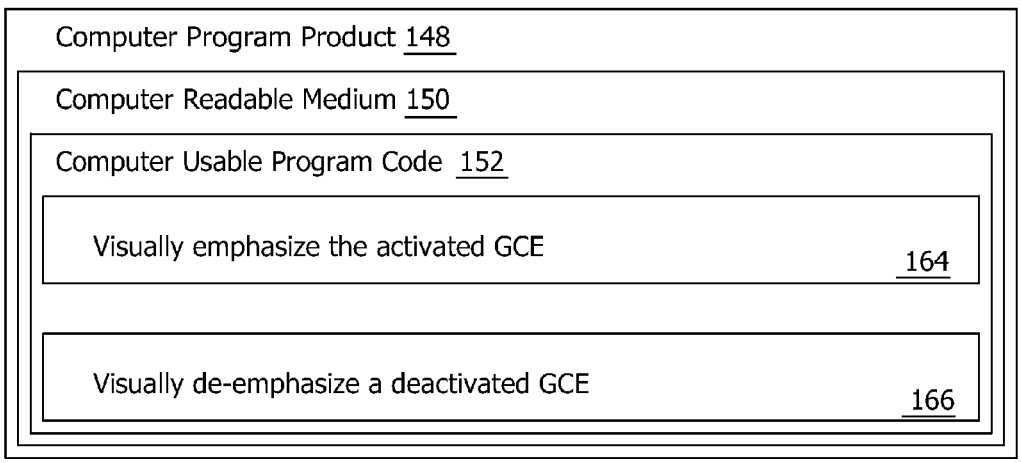
FIG. 12 continues the example of FIGS. 10-11, showing more optional aspects of the computer program product.

The computer program product 148 of FIG. 10 may optionally include an operation of visually emphasizing the activated GCE 164 and visually de-emphasizing a deactivated GCE 166 as shown in FIG. 12. An activated GCE is a GCE that has been selected for adjustment, and a deactivated GCE is one for which no further adjustment is desired.

Figure 13:
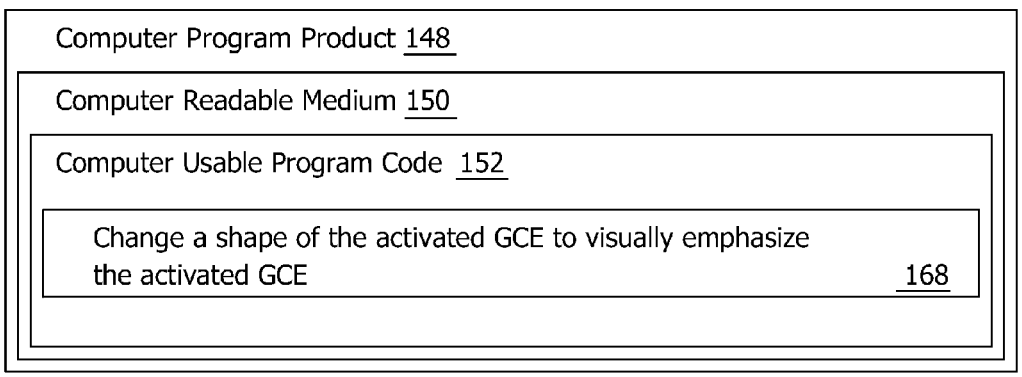
FIG. 13 continues the example of FIGS. 10-12, showing another optional aspect of the computer program product.

The computer program product 148 of FIG. 10 may optionally include an operation of changing a shape of the activated GCE to visually emphasize the activated GCE 168 as shown in FIG. 13.

Figure 14:
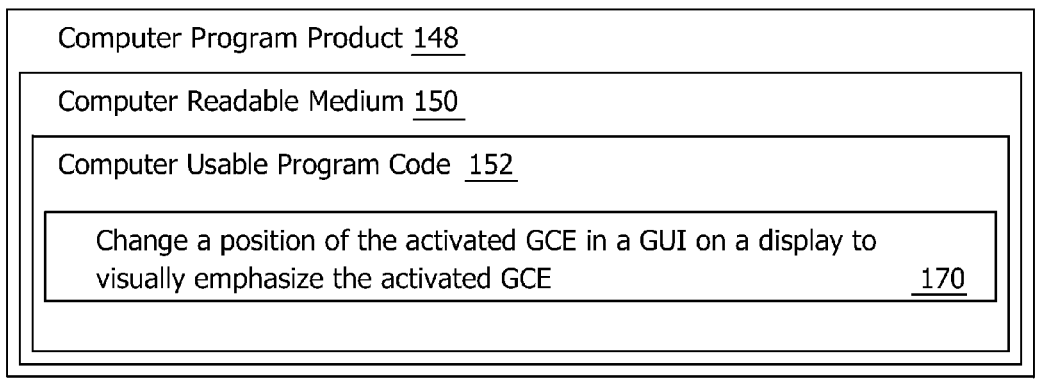
FIG. 14 continues the example of FIGS. 10-13, showing another optional aspect of the computer program product.

The computer program product 148 of FIG. 10 may optionally include an operation of changing a position of the activated GCE in a GUI on a display to visually emphasize the activated GCE 170 as shown in FIG. 14.

Figure 15:
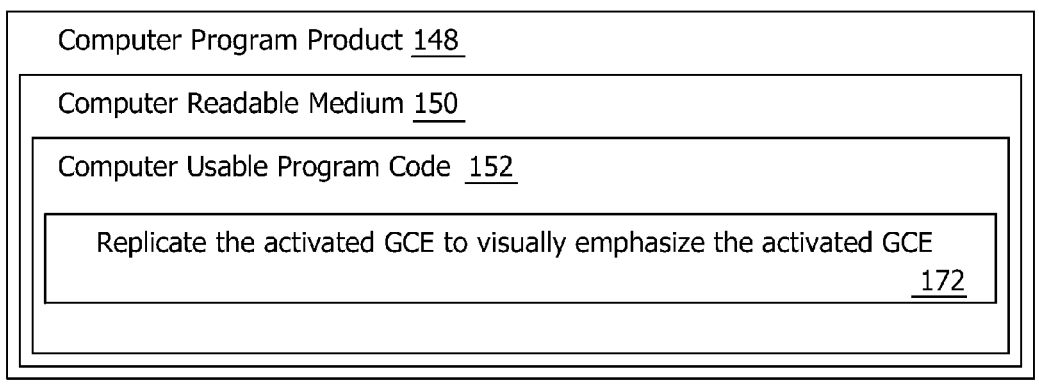
FIG. 15 continues the example of FIGS. 10-14, showing another optional aspect of the computer program product.

The computer program product 148 of FIG. 10 may optionally include an operation of replicating the activated GCE to visually emphasize the activate GCE 172, as shown in FIG. 15.

Those skilled in the art will appreciate that various adaptations and modifications can be configured without departing from the scope and spirit of the embodiments described herein. Therefore, it is to be understood that, within the scope of the appended claims, the embodiments of the invention may be practiced other than as specifically described herein.

What is claimed is:

1. A system comprising:
   a display control module;
   a cursor control device coupled to the display control module;
   a graphical user interface displayable by the display control module, the graphical user interface comprising a plurality of a graphical control element, each of the plurality of the graphical control element operable to control a different controllable parameter; and
   a human interface device in data communication with the display control module, the human interface device comprising a plurality of keys that are separate physical keys, each of the plurality of keys mapped to a separate one of the graphical control element by the display control module, the graphical control element adjustable by the cursor control device while the key mapped to the graphical control element is activated and the graphical control element decoupled from adjustment by the cursor control device when the key mapped to the graphical control element is deactivated,
   wherein adjustment of the graphical control element is prohibited when the separate physical key of the human interface device to which the graphical control element corresponds is placed in an inactive state via the separate physical key being released and not depressed, the separate physical key and not the graphical control element being placed in the inactive state,
   wherein responsive to the separate physical key to which the graphical control element corresponds being placed in an active state via the separate physical key being and remaining depressed, a cursor on the graphical user interface is automatically moved over the graphical control element and the graphical control element is activated, the separate physical key and not the graphical control element being placed in the active state,
   wherein when the separate physical key to which the graphical control element corresponds is in the active state in which the separate physical key is currently being depressed, and the separate physical key is then placed in the inactive state by being released, the graphical control element is deactivated such that the graphical control element is no longer adjustable, wherein when the graphical control element is activated, a larger version thereof is displayed on a bottom of the display control module and is directly manipulated, and an original version of the graphical control element that is smaller than the larger version is still displayed, direct manipulation of the larger version causing corresponding changes to the original version that is smaller.

2. The system of claim 1, wherein each of the plurality of the graphical control element is mapped to a combination of simultaneously selected keys on the human interface device.

3. The system of claim 1, wherein a visual emphasis is applied to the graphical control element when the key mapped to the graphical control element is activated and the visual emphasis is removed from the graphical control element when the key mapped to the graphical control element is deactivated.

4. The system of claim 3, wherein the visual emphasis comprises a change in a shape of the graphical control element.

5. The system of claim 3, wherein the visual emphasis comprises a change in a position of the graphical control element in the graphical user interface.

6. The system of claim 3, wherein the visual emphasis comprises a replication of the graphical control element.

7. The system of claim 1, further comprising a display with a touch input system having an active touch area, the display coupled to the display module for displaying an image representative of the graphical user interface and the touch input system operable as the cursor control device.

8. The system of claim 7, wherein a touch contact detected by the touch input system anywhere within the touch active area adjusts the graphical control element while the key mapped to the graphical control element is activated and adjustment of the graphical control element ends when the key mapped to the graphical control element is deactivated.

9. A system, comprising:
a computing device;
a display coupled to the computing device;
a graphical user interface executed by the computing device, an image corresponding to the graphical user interface presented on the display, the graphical user interface comprising a plurality of a graphical control element, and each of the plurality of the graphical control element corresponding to a different controllable parameter;
a cursor control device coupled to the computing device;
a keyboard-type device coupled to the computing device, the keyboard-type device comprising a plurality of keys that are separate physical keys, each of the plurality of keys assigned to a corresponding one of the plurality of the graphical control element, activation of a selected one of the plurality of keys activates the corresponding graphical control element, the cursor control device adjusts the corresponding graphical control element while the selected one of the plurality of keys is activated, and deactivation of the selected one of the plurality of keys ends adjustment of the corresponding graphical control element by the cursor control device,
wherein adjustment of the graphical control element is prohibited when the separate physical key of the keyboard-type device to which the graphical control element corresponds is placed in an inactive state via the separate physical key being released and not depressed, the separate physical key and not the graphical control element being placed in the inactive state,
wherein responsive to the separate physical key to which the graphical control element corresponds being placed in an active state via the separate physical key being and remaining depressed, a cursor on the graphical user interface is automatically moved over the graphical control element and the graphical control element is activated, the separate physical key and not the graphical control element being placed in the active state,
wherein when the separate physical key to which the graphical control element corresponds is in the active state in which the separate physical key is currently being depressed, and the separate physical key is then placed in the inactive state by being released, the graphical control element is deactivated such that the graphical control element is no longer adjustable,
wherein when the graphical control element is activated, a larger version thereof is displayed on a bottom of the display control module and is directly manipulated, and an original version of the graphical control element that is smaller than the larger version is still display, direct manipulation of the larger version causing corresponding changes to the original version that is smaller.

10. The system of claim 9, wherein the cursor control device is alternatively one of a mouse, a trackball, a cursor control key, a touchpad, or a digitizing tablet.

11. The system of claim 9, wherein activating a key causes a visual emphasis of the corresponding graphical control element and deactivating the key causes the visual emphasis to be removed.

12. The system of claim 11, wherein the visual emphasis comprises a change in a shape of the graphical control element.

13. The display system of claim 11, wherein the visual emphasis comprises a change in a position of the graphical control element in the graphical user interface.

14. The display system of claim 11, wherein the visual emphasis comprises a replication of the graphical control element.

15. A storage device storing computer usable program code, the computer usable program code comprising:
computer usable program code configured to apply visual emphasis to a graphical control element, the computer usable program code comprising:
computer usable program code configured to map a graphical control element in a graphical user interface to a corresponding key on a human interface device having a plurality of keys that are separate physical keys;
computer usable program code configured to activate the graphical control element for adjustment by placing the corresponding key in an active state, the corresponding key and not the graphical control element being placed in the inactive state;
computer usable program code configured to adjust the graphical control element with a cursor control device while maintaining the corresponding key in the active state, the corresponding key and not the graphical control element being placed in the active state; and
computer usable program code configured to terminate adjustment of the graphical control element by placing the corresponding key in an inactive state,
wherein adjustment of the graphical control element is prohibited when the separate physical key of the human interface device to which the graphical control element corresponds is placed in an inactive state via the separate physical key being released and not depressed, wherein responsive to the separate physical key to which the graphical control element corresponds being placed in an active state via the separate physical key being and remaining depressed, a cursor on the graphical user interface is automatically moved over the graphical control element and the graphical control element is activated, wherein when the separate physical key to which the graphical control element corresponds is in the active state in which the separate physical key is currently being depressed, and the separate physical key is then placed in the inactive state by being released, the graphical control element is deactivated such that the graphical control element is no longer adjustable, wherein when the graphical control element is activated a larger version thereof is displayed on a bottom of the display control module and is directly manipulated, and an original version of the graphical control element that is smaller than the larger version is still displayed, direct manipulation of the larger version causing corresponding changes to the original version that is smaller.

16. The storage device of claim 15, further storing:

computer usable program code configured to map each of a plurality of the graphical control element to a different one of a plurality of the corresponding keys on the human interface device.

17. The storage device of claim 15, further storing:

computer usable program code configured to visually emphasize the activated graphical control element; and computer usable program code configured to visually de-emphasize a deactivated graphical control element.

18. The storage device of claim 17, further storing:

computer usable program code configured to replicate the activated graphical control element to visually emphasize the activated graphical control element.

19. A method comprising:

uniquely mapping a physical key of a human interface device to a graphical control element of a graphical user interface, where no other graphical control element is mapped to the physical key;

prohibiting adjustment of the graphical control element when the physical key is placed in an inactive state in which the physical key is not depressed;

when the physical key is in the inactive state and then enters an active state in which the physical key remains depressed via depression of the physical key, moving a cursor of the graphical user interface automatically over the graphical control element and permitting the adjustment of the graphical control element when; and when the physical key is in the active state and then enters the inactive state via release of the physical key, again prohibiting the adjustment of the graphical control element, wherein the physical key transitions from the inactive state to the active state via the depression of the physical key, and transitions from the active state to the inactive state via the release of the physical key, wherein when the graphical control element is activated, a larger version thereof is displayed on a bottom of the display control module and is directly manipulated, and an original version of the graphical control element that is smaller than the larger version is still displayed, direct manipulation of the larger version causing corresponding changes to the original version that is smaller.

20. The system of claim 1, wherein the cursor remains over the graphical control element while the graphical control element is activated and is being manipulated.

21. The system of claim 1, wherein each key is uniquely mapped to a separate and different one of the graphical control elements.

22. The system of claim 1, wherein when the graphical control element is activated, a larger version thereof is displayed and is directly manipulated.

* * * * *